(12) United States Patent
Elliott

(10) Patent No.: US 9,226,225 B2
(45) Date of Patent: Dec. 29, 2015

(54) OVERHEAD-FREE PROVISIONING OF ROAMING WIFI NETWORKS

(75) Inventor: Brent J. Elliott, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 13/977,637

(22) PCT Filed: Apr. 13, 2012

(86) PCT No.: PCT/US2012/033512
§ 371 (c)(1),
(2), (4) Date: May 5, 2014

(87) PCT Pub. No.: WO2013/154577
PCT Pub. Date: Oct. 17, 2013

(65) Prior Publication Data
US 2014/0233374 A1    Aug. 21, 2014

(51) Int. Cl.
*H04W 48/16* (2009.01)
*H04W 4/00* (2009.01)
(Continued)

(52) U.S. Cl.
CPC .............. *H04W 48/16* (2013.01); *H04W 4/001* (2013.01); *H04W 24/04* (2013.01); *H04W 76/027* (2013.01); *H04W 8/18* (2013.01); *H04W 48/18* (2013.01); *H04W 84/12* (2013.01)

(58) Field of Classification Search
CPC ..... H04W 48/18; H04W 84/12; H04W 48/16; H04W 88/06; H04W 48/14; H04W 8/18; H04W 48/20; H04W 72/02; H04W 84/18; H04W 24/04; H04W 4/001; H04W 76/027; H04L 12/66; H04L 67/306; H04L 63/102

USPC .................................. 370/235, 254, 328, 338
See application file for complete search history.

(56) References Cited

U.S. PATENT DOCUMENTS 7,477,632 B1 *   1/2009  Radhakrishnan et al. ..... 370/338
7,561,545 B2 *   7/2009  Abdel-Kader ................ 370/328
(Continued)

FOREIGN PATENT DOCUMENTS

WO         2013/154577 A1      10/2013

OTHER PUBLICATIONS

International Search report and Written Opinion received for PCT Application No. PCT/US2012/033512, mailed on Dec. 12, 2012, 10 pages.

(Continued)

*Primary Examiner* — Gary Mui
*Assistant Examiner* — Michael Phillips
(74) *Attorney, Agent, or Firm* — Sutherland Asbill & Brennan LLP

(57) ABSTRACT

Methods, systems, apparatuses, and computer-readable media are provided for scanning a primary repository for one or more matching primary wireless profiles corresponding to one or more wireless networks, executing a primary connection cycle responsive to a determination that the primary repository stores the one or more matching primary wireless profiles, scanning one or more secondary repositories for one or more matching secondary wireless profiles corresponding to the one or more wireless networks if no matching primary wireless profile is discovered or the primary connection cycle fails, and executing a secondary connection cycle responsive to a determination that the one or more secondary repositories store the one or more matching secondary wireless profiles.

23 Claims, 7 Drawing Sheets

(51) Int. Cl.
*H04W 24/04* (2009.01)
*H04W 76/02* (2009.01)
*H04W 48/18* (2009.01)
*H04W 8/18* (2009.01)
*H04W 84/12* (2009.01)

(56) References Cited

U.S. PATENT DOCUMENTS

| | | | | |
|---|---|---|---|---|
| 7,844,269 | B2 * | 11/2010 | Abdel-Kader | 455/435.2 |
| 8,406,169 | B2 * | 3/2013 | Abdel-Kader | 370/328 |
| 2005/0148332 | A1 * | 7/2005 | Buckley et al. | 455/435.2 |
| 2006/0133330 | A1 * | 6/2006 | Chin | 370/338 |
| 2006/0280128 | A1 | 12/2006 | Abdel-Kader | |
| 2008/0056133 | A1 * | 3/2008 | Deshpande et al. | 370/235 |
| 2008/0279132 | A1 * | 11/2008 | Noishiki et al. | 370/312 |
| 2009/0028082 | A1 | 1/2009 | Wynn et al. | |
| 2010/0291921 | A1 * | 11/2010 | Ruuska et al. | 455/426.1 |
| 2011/0143782 | A1 * | 6/2011 | Dowlatkhah | 455/456.5 |
| 2011/0286437 | A1 * | 11/2011 | Austin et al. | 370/338 |
| 2012/0177032 | A1 * | 7/2012 | Chitty et al. | 370/352 |

OTHER PUBLICATIONS

International Search Report and Written Opinion received for PCT Patent Application No. PCT/US2012/033512, mailed on Dec. 12, 2012, 10 pages.

* cited by examiner

OVERHEAD-FREE PROVISIONING OF ROAMING WIFI NETWORKS

TECHNICAL FIELD

This disclosure relates generally to networking, and more particularly to wireless networking.

BACKGROUND

Wireless networks are becoming an increasingly significant part of the Internet landscape. A wireless network, in general terms, is a network in which wireless (and possibly mobile) users are connected into a larger network infrastructure by one or more wireless (i.e. non-wired) links at the network's edge. Many types of wireless networks exist including, for example, wide area networks (WANs), metropolitan area networks (MANs), local area networks (LANs), personal area networks (PANs), mesh networks, cellular wireless networks including wireless 3G networks or wireless 4G networks based on, for example, Worldwide Interoperability for Microwave Access (WiMAX) and Long-Term Evolution (LTE) communication standards, and so forth. A wireless network's classification depends on, among other things, the bit transmission rate and the geographical range over which data transmission is supported by the network.

At a high level of abstraction, wireless networks may be classified according to two criteria: (1) whether a packet transmitted via the wireless network crosses exactly one hop or multiple wireless hops, and (2) whether the wireless network includes infrastructure such as a base station. This classification scheme generally yields four types of wireless networks including (1) single-hop, infrastructure-based wireless networks which include a base station (e.g., an entity responsible for sending and receiving data to and from wireless host(s) associated with the base station) and in which all communication between the base station and a particular wireless host occurs over a single wireless hop, (2) single-hop, infrastructure-less wireless networks that do not include a base station and in which one of the nodes in the network may coordinate transmissions of the other nodes over a single hop, (3) multi-hop, infrastructure-based wireless networks which include a base station, but in which some wireless nodes may have to relay their communication through other wireless nodes (e.g. wireless mesh networks), and (4) multi-hop, infrastructure-less wireless networks that do not include a base station and in which nodes may have to relay messages among several other nodes in order to reach a destination. Infrastructure-less wireless networks may also be referred to as ad-hoc wireless networks.

As previously noted, in infrastructure-based networks, a base station may send and receive data between associated wireless host(s). Wireless LANs have become a particularly ubiquitous form of infrastructure-based wireless networks, with one particular class of standards emerging as the dominant form, the Institute of Electrical and Electronics Engineers (IEEE) 802.11 wireless LAN, also known as WiFi. Various IEEE 802.11 standards for wireless LAN technology exist, including 802.11b, 802.11a, and 802.11g and 802.11n, which share various characteristics such as use of the same medium access protocol and frame structure for their link layer frames. However, these various standards differ in the frequency ranges in which they operate and their respective data rates such that each standard offers advantages and disadvantages over the other standards.

BRIEF DESCRIPTION OF THE FIGURES

Throughout the detailed description that follows, reference will be made to the accompanying drawings, which form part of this disclosure. The accompanying drawings are not necessarily drawn to scale. A brief description of each drawing follows.

DETAILED DESCRIPTION OF EMBODIMENTS OF THE DISCLOSURE

Embodiments of the disclosure relate to systems, methods, apparatuses, and computer-readable media for enabling seamless wireless network roaming among wireless devices. While embodiments of the disclosure may be described herein primarily through reference to the IEEE 802.11 wireless LAN architecture (WiFi), the disclosure is not so limited. Embodiments of the disclosure are applicable to any wireless technology that involves scanning for information that may include one or more potential matches for establishing a wireless connection between two or more devices. Further, while embodiments of the disclosure may be described primarily through reference to infrastructure-based networks, embodiments of the disclosure are equally applicable to any form of wireless network including infrastructure-less wireless networks.

Throughout this disclosure, the term "wireless network" shall refer to any network comprising two or more devices that are capable of communicating, at least in part, via a wireless communicative link. While embodiments of the disclosure are generally applicable to any type of wireless network, specific embodiments of the disclosure may be described herein using the IEEE 802.11 wireless LAN infrastructure as an exemplary wireless network.

A fundamental building block of the IEEE 802.11 wireless LAN architecture is the basic service set (BSS) which may contain one or more wireless stations (or hosts) and a central base station, known as an access point (AP). An AP of more than one BSS may connect to an interconnection device (such as a switch or router), which in turn may connect to the broader Internet architecture. Further, an extended service set (ESS) is a set of one or more interconnected BSSs and integrated local area network(s) that appear as a single BSS to the logical link control layer at any wireless device associated with one of the BSSs forming part of the ESS.

Embodiments of the disclosure are described more fully hereinafter through reference to the accompanying drawings, in which certain embodiments of the disclosure are shown. This disclosure may, however, be embodied in many different forms and should not be construed as being limited to the embodiments set forth herein; rather, these embodiments are provided so that this disclosure will be thorough and complete, and will fully convey the scope of the disclosure to those skilled in the art. Like numbers refer to like elements throughout.

Example embodiments of the disclosure will now be described with reference to the accompanying figures.

Figure 1:
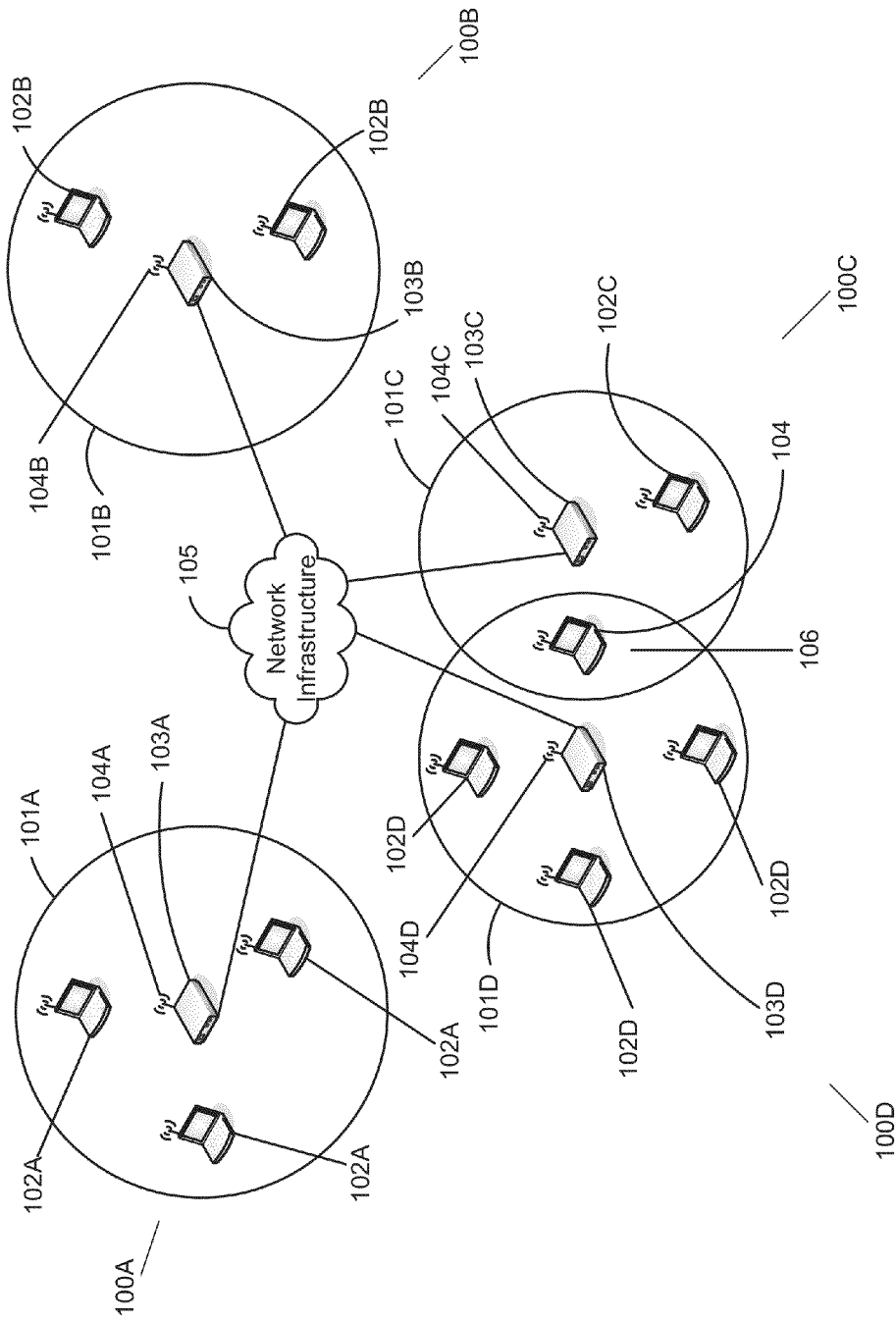
FIG. 1 is a schematic representation of multiple wireless networks connected to a network infrastructure in accordance with one or more embodiments of the disclosure.

FIG. 1 depicts a schematic representation of a plurality of wireless networks 100A-100D. The wireless networks 100A-100D may each be WiFi networks, and more particularly, may each represent a BSS or an ESS. The wireless networks 100A-100D may represent at least part of a global roaming wireless network and may be provided by one or more service providers that form at least part of a roaming partnership of service providers.

The wireless networks 100A-100D may include respective base stations or access points (APs) 103A-103D. The APs 103A-103D may each be connected to a network infrastructure 105 (e.g., the Internet) which may include one or more packet switches and one or more wired or wireless communication links. The APs 103A-103D may broadcast respective beacon signals 104A-104D (also known as beacon frames in the IEEE 802.11 wireless LAN architecture) that are received by respective wireless devices (or hosts) 102A-102D within respective coverage areas 101A-101D (or basic service areas (BSAs) in WiFi parlance).

Under the WiFi set of standards, each AP is assigned a service set identifier (SSID) that identifies the associated wireless LAN to wireless stations within its coverage area and a channel number that represents a portion of the frequency band in which the IEEE 802.11 wireless LAN architecture operates. An AP periodically broadcasts a beacon frame that includes, among other information, the AP's SSID and MAC address. Wireless stations may passively scan the corresponding channels to detect beacon frames broadcast from one or more APs of wireless LANs. If the AP is part of an ESS, the AP may broadcast a beacon signal that includes an extended service set identifier (ESSID) associated with the AP. For the purposes of this disclosure, the term ESSID will be used to refer to a wireless network identifier associated with a corresponding wireless network. However, it should be noted that the term ESSID, as used herein, also encompasses any one or more network identifier(s) in any form that may be used to identify a wireless network.

Referring again to FIG. 1, in an exemplary wireless network 100C, an AP 103C broadcasts a beacon signal 104C that is received by one or more wireless devices 102C within a coverage area 101C. The beacon signal 104C received by the one or more wireless devices 102C from the AP 103C may be an electromagnetic signal that is a combination of a degraded form of the original signal 104C broadcast by the AP 103C (degraded as a result of attenuation and multipath propagation effects), and interference from other sources (i.e. noise). Signal-to-noise ratio (SNR) is a relative measure of the strength of the signal received by a wireless host in relation to noise received by the wireless host and may be used as a measure of the connection viability of the associated wireless network.

An exemplary wireless network 100D includes an AP 103D that broadcasts a beacon signal 104D that is received by one or more wireless devices 102D within a coverage area 101D. The coverage areas 101C and 101D include an overlapping region 106 in which a wireless device 104 is capable of receiving the beacon signals 104C and 104D broadcast by the APs 103C and 103D, respectively. The wireless device 104 may then choose which of the APs 103C and 103D with which to attempt to establish a connection. In the case of WiFi networks, such a scenario may be referred to as a WiFi jungle (e.g., a situation in which a wireless host receives a beacon frame from two or more APs such that the wireless host may choose one of the APs for association). Assuming that the wireless device 104 attempts to establish a connection with the AP 103C, the wireless device 104 may send an association request frame to the AP 103C, and the AP 103C may respond with an association response frame. Once the wireless device 104 and the AP 103C are associated, the wireless device 104 may attempt to join a subnet to which the AP 103C belongs and in ay optionally execute authentication and encryption functions as may be required before and/or as part of joining the subnet. Specifically, the wireless device 104 will send a Dynamic Host Configuration Protocol (DHCP) discovery message into the subnet with which the AP 103C is associated via the AP 103C in order to obtain an Internet Protocol (IP) address on the subnet Once the IP address is obtained, other wireless devices will view the wireless device 104 as another wireless host with an IP address within that subnet.

In order to create an association with the AP 103C, the wireless device 104 may be required to authenticate itself. The IEEE 802.11 wireless LAN standards provide various alternative for authentication and access. One approach is to permit access based on a MAC address of the wireless device. Other approaches are to employ usernames and passwords, certificates, or Subscriber Identity Module (SIM) cards. Under one or more of these approaches, the AP may communicate with a centralized authentication server, relaying information between the wireless device that is attempting to authenticate itself and the authentication server using various communication protocols.

A wireless device may passively scan one or more frequency ranges for beacon signals broadcast by access points of wireless networks. For example, a wireless device that supports a connection under the IEEE. 802.11b WiFi standard may passively scan one or more channels within a frequency range from 2.4-2.485 GHz to detect beacon signals broadcast on the scanned channels. Beacon signals received by a wireless host may include, among other things, an SSID (or ESSID) and a MAC address that may identify the AP that generated the beacon signal.

A global roaming network may include hundreds or even thousands of component wireless networks, each with one more APs having an associated ESSID. In order for a wireless device to be able to seamlessly connect to any particular wireless network within the global roaming network, a corresponding number of wireless profiles may need to be provisioned into the wireless device. Provisioning hundreds or even thousands of wireless profiles into a wireless device's native repository in order to provide connectivity across the global roaming network has several disadvantages. As used herein, the term "provisioning" may refer to providing services and/or content to a wireless device. In the case of wireless profiles, the term "provisioning" may refer to storing the wireless profile in, or otherwise associating the wireless profile with, a repository associated with the wireless device. The profile may include, but is not limited to, information to identify the network when available, information necessary to authenticate and connect to the network, or policies corresponding to the selection or use of the network. The repository may be located within the device or located externally from the device and accessible by the device. The repository may include any means for storing or organizing data.

For example, a user of a wireless device often manually manages wireless profiles provisioned on the wireless device and may encounter difficulty in prioritizing and managing a large number of roaming wireless profiles provisioned into the native repository of the wireless device. Additionally, the WiFi set of standards supports active scanning (also known as active probing) where a wireless host broadcasts a probe request frame that is received by all APs within a certain range of the wireless host. An AP may then respond to the probe request frame with a probe response frame, at which point the wireless device may attempt to associate with the AP using the procedure previously described. If a large number of wireless profiles are cached in the native repository, active scanning of each of these wireless profiles may generate excessive overhead and significantly delay the network selection and connection process for the wireless device.

Figure 2:
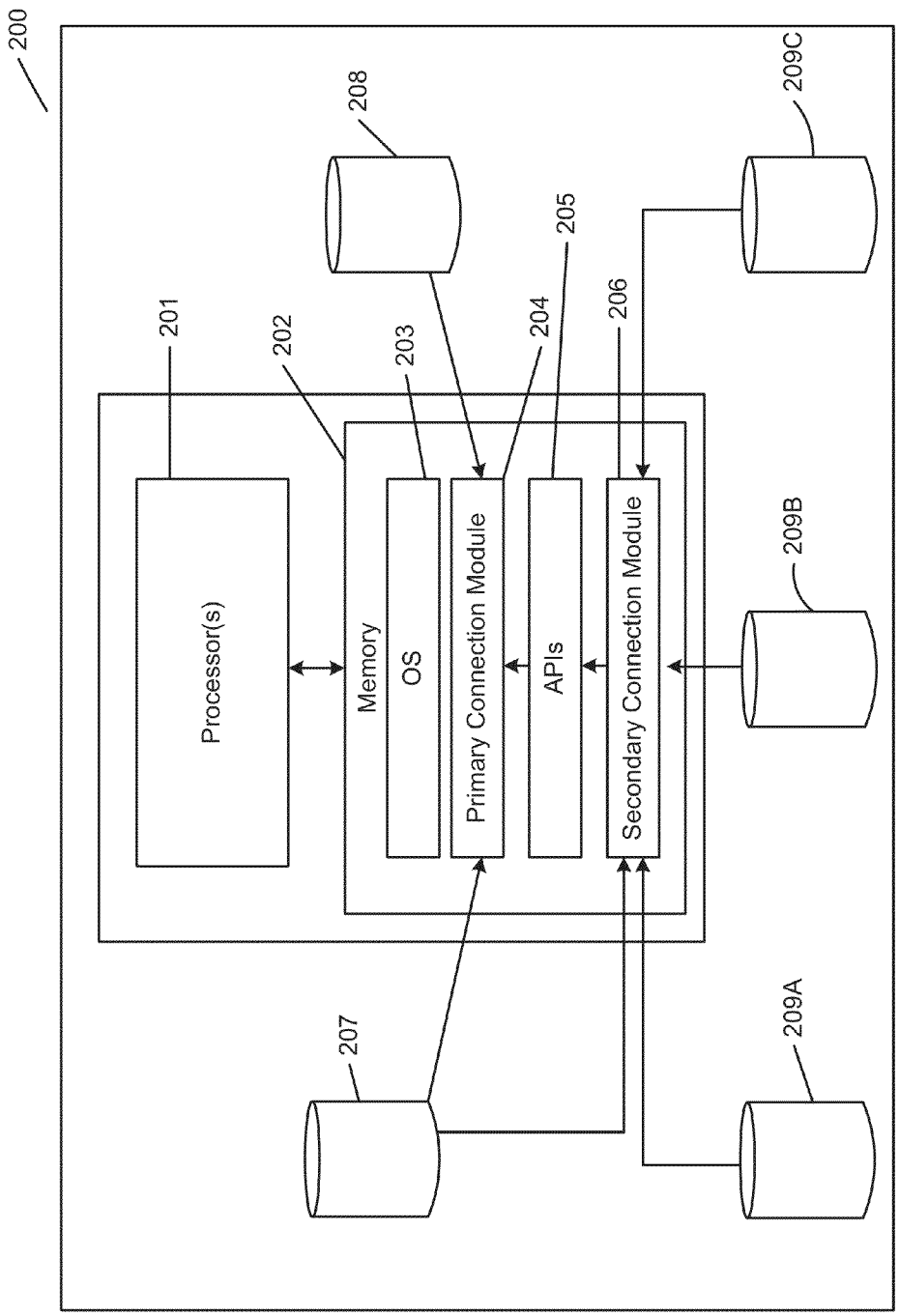
FIG. 2 is a block diagram illustrating various components of an exemplary system in accordance with one or more embodiments of the disclosure.

FIG. 2 is a schematic depiction of a system 200 in accordance with one or more embodiments of the disclosure that addresses at least one or more of the disadvantages of storing, in a native repository, a large number of wireless profiles corresponding to wireless networks that form part of a roaming wireless network. In particular, the system 200 supports the provisioning of an arbitrary number of unique ESSIDs in a roaming wireless network without any discernable impact on usability of the wireless device or on overhead.

Some or all of the components of the system 200 may be provided as part of a wireless device. The system 200 may include one or more processors 201 that may be operatively coupled to at least one memory 202. The memory 202 may include one or more volatile and/or non-volatile memory devices including, but not limited to, magnetic storage devices, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or any combinations thereof.

The system 200 may further include an operating system (OS) 203 loaded into the memory 202. The OS 203 may comprise any operating system now known in the art or which may be developed in the future including, but not limited to, any version of Apple® iOS, any Android®-based operating systems, any version of the Palm® webOS operating system, any version of the Windows® Mobile operating system, any version of the Windows® Phone operating system, any version of Blackberry® OS, any version of Windows® operating system, any version of Nokia®'s Symbian operating system, any version of Nokia®'s Maemo operating system, any version of MeeGo (a Linux®-based operating system), or any version of Samsung®'s bada operating system, to name a few.

The memory 202 may further comprise a primary connection module 204 and a secondary connection module 206. The system 200 may further comprise a repository 207 that may store a data structure comprising each wireless network identifier (e.g. ESSID) included in a respective beacon signal received by the wireless device, a primary repository 208 (which may also referred to herein as a native repository) that stores one or more primary wireless profiles corresponding to one or more wireless networks, and one or more secondary repositories 209A-209C (which may also be referred to herein as roaming repositories) that store one or more secondary wireless profiles. The primary repository 208 and the one or more secondary repositories 209A-209C may correspond to logical or physical partitions within the wireless device, or may be provided externally to the wireless device and accessible by the wireless device. The terms "primary" and "secondary" are used herein merely to distinguish between modules 204 and 206, to distinguish between repository 208 and repositories 209A-209C, and to distinguish between different connection cycles (described more fully hereinafter) and do not imply any particular ordering, weighting, or preference relating thereto.

The primary connection module 204 may include traditional middleware or a connection manager that performs an automated connection process that may include querying the data structure of wireless network identifiers stored in repository 207 against the one or more primary wireless profiles stored in the primary repository 208 to determine if the primary repository 208 stores one or more matching primary wireless profiles. A "matching primary wireless profile" may refer to a primary wireless profile stored in the primary repository 208 that includes a wireless network identifier, or other information, that matches or corresponds to one of the wireless network identifiers in the data structure stored in repository 207. A profile which "corresponds" to a given network identifier also encompasses, but is not limited to, an entry which contains wildcard(s) or information relating to other fields advertised by or which can be queried from the network for the purposes of identifying a potential network with which to connect. Examples of such information, may include, but is not limited to, one or more roaming consortiums, Third Generation Partnership Project (3GPP) network identifiers, or authentication domains. If the primary connection module 204 determines that the primary repository 208 stores one or more matching primary wireless profiles, the primary connection module 204 may initiate a primary connection cycle (described in more detail through reference to FIGS. 3 and 4) in which the primary connection module 204 attempts to establish a connection between the wireless device and one or more of the wireless networks corresponding to respective matching primary wireless profile(s) until a connection is established with one of the wireless networks or the connection process fails for each matching primary wireless profile.

The secondary connection module 206 may monitor the primary connection cycle performed by the primary connection module 204 via one or more Application Programming Interfaces (APIs) 205. The secondary connection module 206 may include enhanced client software provided in various forms including, but not limited to, enhanced middleware, an enhanced connection manager, or a separate client application. By monitoring the primary connection cycle performed by the primary connection module 204, the secondary connection module 206 may identify when the primary connection cycle has failed to establish a connection between the wireless device and a wireless network or when no matching primary wireless profile(s) are found, and may proceed to query the data structure of wireless network identifiers against at least one of the one or more secondary repositories 209A-209C to determine if one or more matching secondary wireless profiles are stored therein. A "matching secondary wireless profile" may refer to a wireless profile provisioned in at least one of the secondary repositories 209A-209C that includes a wireless network identifier, or other information, that matches or corresponds to one of the wireless network identifiers included in the data structure of repository 207. As previously noted, a profile which "corresponds" to a given network identifier also encompasses, but is not limited to, an entry which contains wildcard(s) or information relating to other fields advertised by or which can be queried from the network for the purposes of identifying a potential network with which to connect. The data structure storing the respective wireless network identifiers included in received beacon signals may be, for example, an ESSID scan list.

If the secondary connection module 206 determines that one or more matching secondary wireless profiles are stored in at least one of the one or more secondary repositories 209A-209C, then the secondary connection module 206 may initiate a secondary connection cycle (described in more detail through reference to FIGS. 3 and 5-7) in which the secondary connection module 206 attempts to establish a connection between the wireless device and one or more of the wireless networks corresponding to respective matching secondary wireless profile(s) until a connection is established between the wireless device and one of the wireless networks based on a corresponding matching secondary wireless profile or until the secondary connection cycle is performed for and fails for each matching secondary wireless profile.

In the event that a connection is established between the wireless device and a wireless network based on a corresponding matching secondary wireless profile, where, for example, successful establishment of a connection includes successful association, authentication, and DHCP completion, the corresponding matching secondary wireless profile may be duplicated into the primary repository 208 in order to accelerate future connections to that wireless network and to enable a user of the wireless device to configure his/her preferences with respect to the connected network. In connection with duplicating the matching secondary wireless profile that forms the basis for a successful wireless connection into the primary repository 208 as a primary wireless profile, an indicator may be associated with the profile that provides an indication that the profile is a secondary wireless profile (e.g. a roaming profile). As will be described in more detail hereinafter, the secondary connection cycle may be performed by the secondary connection module 206 based on connection priorities assigned to the wireless networks, connection priorities assigned to the matching secondary wireless profiles, and/or connection priorities assigned to the one or more secondary repositories 209A-209C.

Figure 3:
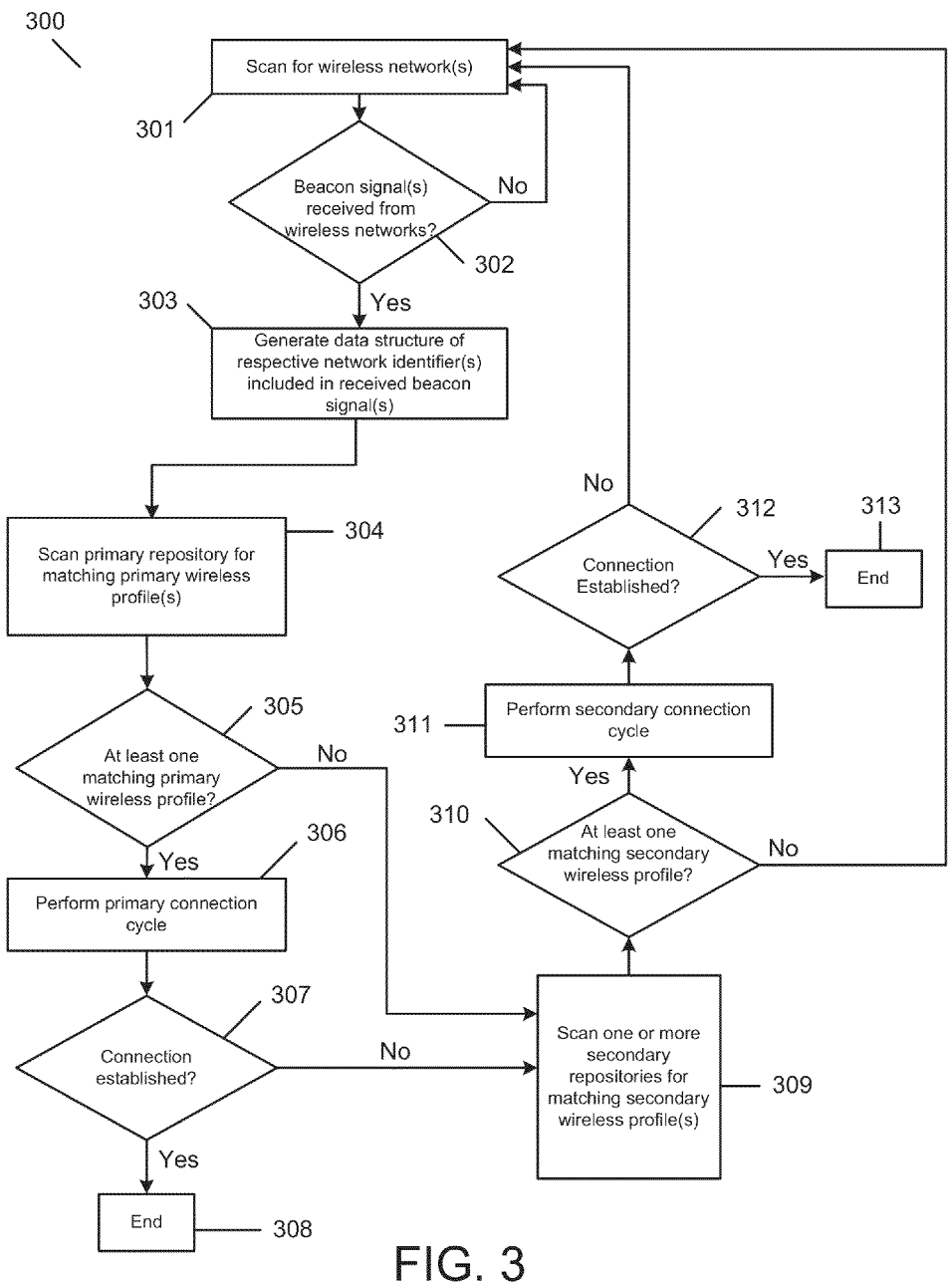
FIG. 3 is a flow diagram illustrating an exemplary method in accordance with one or more embodiments of the disclosure.

FIG. 3 depicts a flow diagram illustrating a method 300 in accordance with one or more embodiments of the disclosure. At block 301, a wireless device may scan for beacon signals from AP(s) of one or more wireless networks. At block 302, a determination may be made as to whether at least one beacon signal has been received by the wireless device. If it is determined that no beacon signals have been received, the process may return to block 301 and the wireless device may continue to scan for wireless network(s) within range of the wireless device, or more specifically, for beacon signals from the AP(s) of such wireless network(s). At block 302, if it is determined that at least one beacon signal has been received by the wireless device, a data structure comprising the respective network identifiers included in the received beacon signal(s) may be generated at block 303. The data structure may be, for example, a list of ESSIDs received in beacon signal(s).

Upon generation of the data structure comprising the respective wireless network identifiers, the primary connection module 204 may scan the primary repository 208 for matching primary wireless profiles at block 304. As previously described, a "matching primary wireless profile" is a wireless profile stored in the primary (or native) repository 208 associated with the wireless device and which comprises a wireless network identifier (e.g., ESSID), or other information, that matches or corresponds to a wireless network identifier of an available wireless network (e.g., a wireless network identifier included in a beacon signal received by the wireless device).

At block 305, a determination may be made as to whether the primary repository 208 stores at least one matching primary wireless profile. If it is determined that the primary repository 208 does not store at least one matching primary wireless profile, the secondary connection module 206, which may monitor or which may be triggered by the connection process performed by the primary connection module 204 via one or more existing or new APIs, may scan, at block 309, one or more of the secondary repositories 209A-209C for matching secondary wireless profiles (described in more detail hereinafter).

On the other hand, if it is determined, at block 305, that the primary repository 208 stores at least one matching primary wireless profile, the primary connection module 204 may perform a primary connection cycle at block 306. The primary connection cycle will be described in greater detail hereinafter through reference to FIG. 4. If it is determined, at block 307, that a connection was successfully established between the wireless device and a wireless network based on a corresponding matching primary wireless profile during the primary connection cycle, then the process may end at block 308. On the other hand, if it is determined, at block 307, that the primary connection cycle fails to establish a successful connection between the wireless device and a wireless network, the secondary connection module 206 may scan one or more of the secondary repositories 209A-209C for matching secondary wireless profiles at block 309. As previously described, the secondary module 206 may monitor the primary connection cycle performed by the primary connection module 204 via existing or new APIs and may determine when the primary connection cycle fails to establish an automatic connection between the wireless device and a wireless network.

Upon scanning one or more of the secondary repositories 209A-209C for matching secondary wireless profile(s), a determination may be made, at block 310, as to whether at least one matching secondary wireless profile exists. As previously described, a "matching secondary wireless profile" refers to a wireless profile stored in a secondary repository and which may include a wireless network identifier, or other information, that matches or corresponds to the wireless network identifier, or other information, associated with an AP of a wireless network (e.g., the ESSID included in a received beacon signal). If, at block 310, it is determined that at least one matching secondary wireless profile exists, the secondary connection module 206 may initiate execution of a secondary connection cycle at block 311. The secondary connection cycle will be described in more detail hereinafter through reference to FIGS. 5-7.

At block 312, a determination may be made as to whether a successful connection was established, during execution of the secondary connection cycle, between the wireless device and a wireless network based on a corresponding matching secondary wireless profile. If it is determined that a successful connection was established, the process may end at block 313. On the other hand if the secondary connection cycle is unsuccessful in establishing a connection between the wireless device and any one of the wireless networks corresponding to the matching secondary wireless profile(s), the wireless device may again scan for beacon signals received from AP(s) of wireless network(s) within range (block 301). The data structure that may be generated at block 303 may be periodically updated to include respective wireless network identifier(s) from newly received beacon signal(s), or to delete respective wireless network identifier(s) corresponding to wireless network(s) that are no longer within range of the wireless device.

Figure 4:
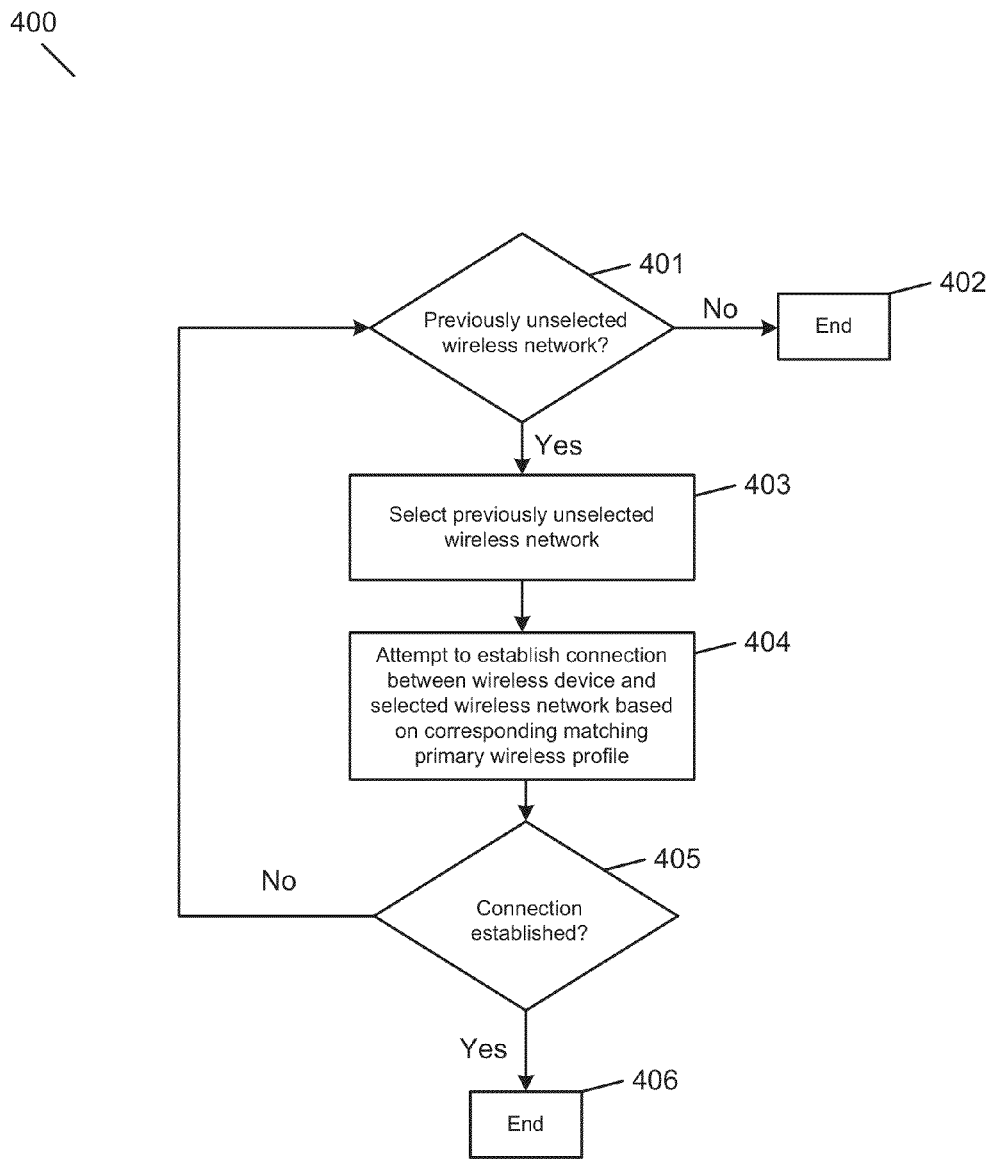
FIG. 4 is a flow diagram illustrating an exemplary primary connection cycle in accordance with an embodiment of the disclosure.

FIG. 4 depicts a flow diagram illustrating a primary connection cycle 400 in accordance with one or more embodiments of the disclosure. As previously described, the primary connection module 204, which may comprise middleware or a connection manager, may execute the primary connection cycle upon determining that the primary repository 208 stores one or more matching primary wireless profiles. At block 401, a determination may be made as to whether a wireless network exists that corresponds to one of the matching primary wireless for which the primary connection cycle has not been executed during a current or recent execution of the primary execution cycle (e.g., a previously unselected wireless network in the context of the primary connection cycle). If it is determined that such a wireless network does not exist (e.g., the primary connection cycle has been executed during a current execution cycle or a recent execution cycle, for each wireless network corresponding to a matching primary wireless profile and has failed to successfully establish a connection), the primary connection cycle 400 may end at block 402. If it is determined that at least one previously unselected wireless network exists, one of the previously unselected wireless networks may be selected at block 403. Upon selection of a wireless network, the primary connection module 204 may attempt, at block 404, to establish a connection between the wireless device and the selected wireless network based on a corresponding matching primary wireless profile.

At block 405, a determination may be made as to whether a successful connection was established between the wireless device and the selected wireless network. A successful connection is established, for example, when the corresponding matching primary wireless profile includes appropriate authentication credential(s) (e.g., user name and password) for authentication by the selected wireless network, an IP address is received via DHCP, and Internet connectivity is available. If it is determined that a successful connection was established, the primary connection cycle 400 may end at block 406. Alternatively, if it is determined that a successful connection was not established between the wireless device and the selected wireless network, the primary connection cycle 400 may return to block 401, and a determination may once again be made as to whether a previously unselected wireless network exists. If the primary connection cycle 400 fails to establish a successful connection between the wireless device and any one of the wireless networks corresponding to a matching primary wireless profile, the primary connection cycle 400 may end at block 402.

The secondary connection module 206 may monitor the primary connection cycle 400 executed by the primary connection module 204 via one or more existing or new APIs, and upon failure of the primary connection cycle 400 to establish a successful wireless connection, may scan one or more of the secondary repositories 209A-209C for matching secondary wireless profile(s).

Figure 5:
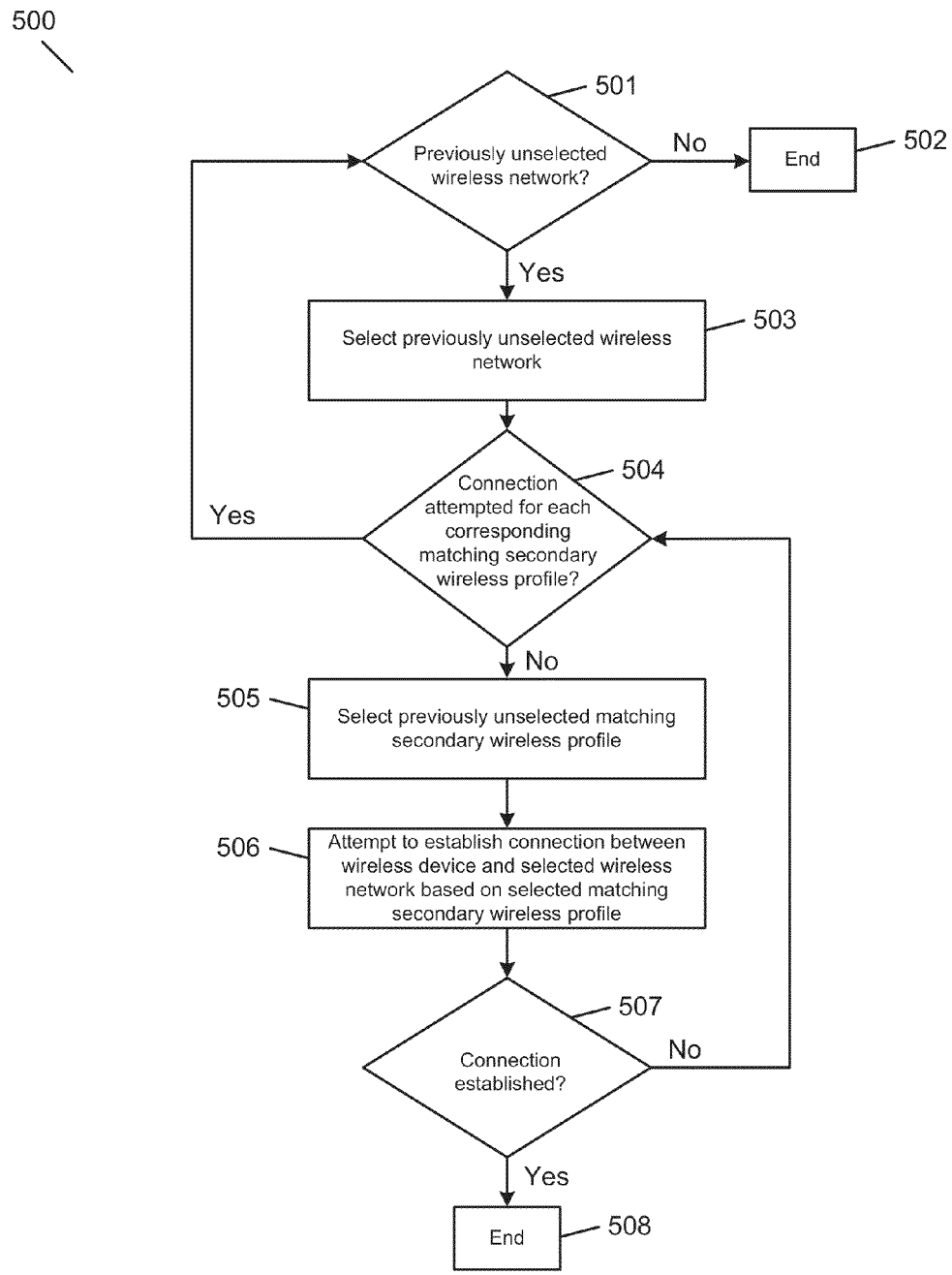
FIG. 5 is a flow diagram illustrating an exemplary secondary connection cycle in accordance with an embodiment of the disclosure.
Figure 6:
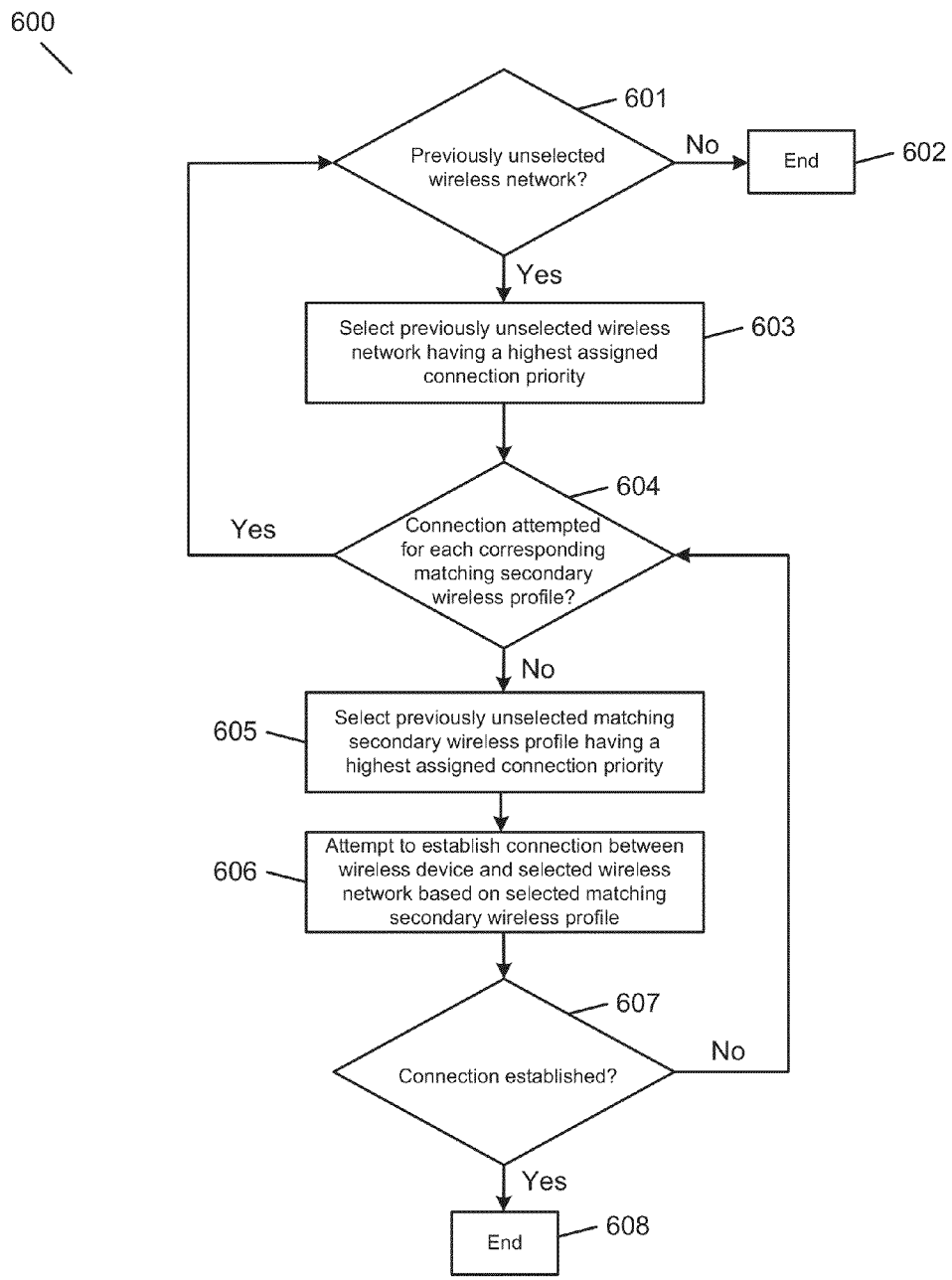
FIG. 6 is a flow diagram illustrating an exemplary secondary connection cycle in accordance with another embodiment of the disclosure.
Figure 7:
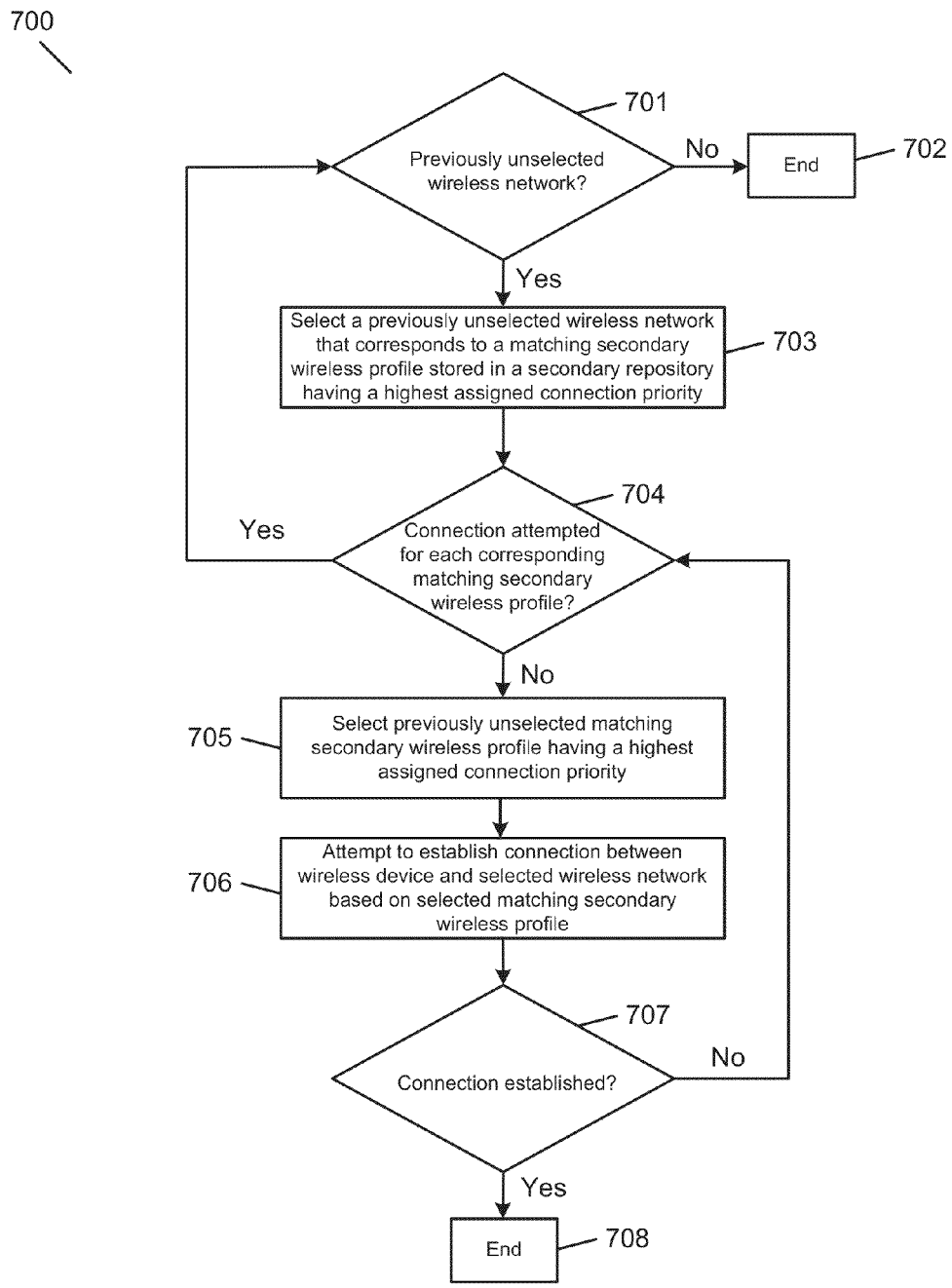
FIG. 7 is a flow diagram illustrating an exemplary secondary connection cycle in accordance with another embodiment of the disclosure.

FIGS. 5-7 depict flow diagrams that respectively illustrate various embodiments of a secondary connection cycle that may be executed upon detection of at least one matching secondary wireless profile.

FIG. 5 depicts a flow diagram illustrating a secondary connection cycle 500 in accordance with an embodiment of the disclosure. At block 501, a determination may be made as to whether a previously unselected wireless network exists. In the context of the secondary connection cycle 500 depicted in FIG. 5, a previously unselected wireless network may refer to a wireless network that corresponds to at least one matching secondary wireless profile and for which the secondary connection cycle has not previously failed to establish a connection with the wireless device as part of a current execution or a recent execution of the secondary connection cycle. If it is determined, at block 501, that a previously unselected wireless network does not exist, the secondary connection cycle 500 may end at block 502. On the other hand, if it is determined that at least one previously unselected wireless network does exist, one of the previously unselected wireless networks may be selected at block 503.

Upon selection of a wireless network a determination may be made at block 504 as to whether the secondary connection module 206 has attempted to establish a connection between the wireless device and the selected wireless network based on each corresponding matching secondary wireless profile. In various embodiments of the disclosure, this determination may be skipped during a first iteration of the secondary connection cycle 500 for a particular selected wireless network. If it is determined that a connection has been attempted for each matching secondary wireless profile corresponding to the selected wireless network, the secondary connection cycle 500 may return to block 501, and a determination may again be made as to whether a previously unselected wireless network exists.

If it is determined that at least one matching secondary profile exists that corresponds to the selected wireless network and that the secondary connection cycle 500 has not attempted to establish, within a current or a recent execution of the cycle 500, a connection between the wireless device and the selected wireless network, a previously unselected matching secondary wireless profile that corresponds to the selected wireless network may be selected at block 505. In accordance with various embodiments of the disclosure, more than one matching secondary wireless profile may correspond to a wireless network represented in the ESSID data structure, with each secondary profile including the network identifier or other information relating to the corresponding wireless network and potentially different authentication credentials. In addition, for some security protocols such as WiFi Protected Access (WPA) and WiFi Protected Access II (WPA2), which were developed in response to serious weaknesses uncovered in the previous system known as Wired Equivalent Privacy (WEP), credentials may be shared across many wireless profiles. The provisioning of secondary wireless profiles may be organized so as to minimize the duplication of credentials, which in turn may minimize provisioning package size and simplify subsequent updates of credentials across several secondary wireless profiles. The use of wildcards or other information relating to other fields advertised by or which can be queried from a wireless network for the purposes of identifying potential connectivity with the network may likewise offer greater flexibility and/or reduce provisioning package size.

In the context of the secondary connection cycle 500, a previously unselected matching secondary wireless profile may refer to a matching secondary wireless profile for which the secondary connection cycle 500 has not attempted or failed to establish a connection between the wireless device and the corresponding wireless network during a current or recent execution of the cycle 500 or since a most recent trigger event. Exemplary trigger events include, but are not limited to, a defined global timeout, a defined profile timeout, absence of the network identifier (ESSID) included in the profile from the ESSID data structure for a defined period of time, or a new instantiation of the secondary connection module 206.

At block 506, the secondary connection module 206 may attempt to establish a connection between the wireless device and the selected wireless network based on the selected matching secondary wireless profile that corresponds to the selected wireless network.

At block 507, a determination may be made as to whether a successful connection was established between the wireless device and the selected wireless network based on the selected matching secondary wireless profile corresponding to the selected wireless network. A connection may be successfully established when, for example, the selected matching secondary wireless profile includes one or more authentication credentials accepted by the selected wireless network and receives an IP address within a subnet associated with the wireless network. If it is determined that a connection is successfully established at block 507, the secondary connection cycle 500 may end at block 508. If it is determined, at block 507, that a connection between the wireless device and the selected wireless network has not been successfully established based on the selected matching secondary wireless profile, the secondary connection cycle 500 may return to block 504, and a determination may be made as to whether a connection between the wireless device and the selected wireless network has been attempted, during the current or a recent execution of the secondary connection cycle, for each matching secondary wireless profile corresponding to the selected wireless network.

If it is determined that a connection has been attempted for each matching secondary wireless profile corresponding to the selected wireless network, the secondary connection cycle 500 may return to block 501, and a determination may again be made as to whether a previously unselected wireless network exists. On the other hand, if it is determined that at least one matching secondary wireless profile exists that corresponds to the selected wireless network and for which a connection between the wireless device and the selected wireless network has not been attempted during the current or recent execution of the secondary connection cycle 500, a previously unselected matching secondary profile may be chosen and the secondary connection cycle 500 may proceed as previously described.

FIG. 6 depicts a flow diagram illustrating a secondary connection cycle 600 in accordance with one or more additional embodiments of the disclosure. The secondary connection cycle 600 depicted in FIG. 6 differs from the secondary connection cycle 500 depicted in FIG. 5 in that wireless network(s) and/or secondary wireless profile(s) may have connection priorities assigned thereto as part of secondary connection cycle 600.

If it is determined, at block 601, that a previously unselected wireless network exists, a previously unselected wireless network having a highest assigned connection priority among all previously unselected wireless networks may be selected (block 603). The secondary connection module 206 may comprise computer program instructions for assigning connection priorities to wireless networks. In one or more embodiments of the disclosure, connection priorities assigned to wireless networks may be thought of as connection priorities assigned to wireless profiles that correspond to the wireless networks (e.g., matching secondary wireless profiles). A connection priority assigned to a particular wireless network may be based on one or more criteria including, but not limited to, a received indication of the signal strength of the wireless network, a signal-to-noise ratio (SNR) of the wireless network, a duration a metric associated with the wireless network has exceeded one or more criteria, a connection quality previously achieved on the network. by the current wireless device or other wireless device(s), metric(s) advertised by the wireless network, a frequency band over which the wireless network transmits and receives data, or a channel utilization of the wireless network (e.g. a measure of the traffic on the wireless network). These criteria may be weighted manually by the user of the wireless device author may be assessed according to one or more algorithms in order to determine an order in which the secondary connection module 206 attempts to establish connections between the wireless device and the wireless networks.

Upon selecting, at block 603, a previously unselected wireless network having a highest assigned connection priority among all previously unselected wireless networks, a determination may then be made, at block 604, as to whether a connection has been attempted for each matching secondary wireless profile that corresponds to the selected wireless network. As previously noted, more than one matching secondary wireless profile may correspond to a particular wireless network within range. As such, connection priorities may also be assigned to the matching secondary wireless profiles in accordance with one or more embodiments of the disclosure. For example, if five different matching secondary wireless profiles correspond to a particular selected wireless network, the secondary connection module 206 may attempt to establish a connection between the wireless device and the selected wireless network in order based on the connection priority assigned to each matching secondary wireless profile. Connection priorities may be assigned manually by a user of the wireless device or through an automated process.

At block 604 of the secondary connection cycle 600, a determination may be made as to whether a connection has been attempted for each matching secondary wireless profile corresponding to the selected wireless network. If it is determined that connection has been attempted and failed for each matching secondary wireless profile corresponding to the selected wireless network during the current or a recent execution of the secondary connection cycle 600, the secondary connection cycle 600 may return to block 601, and a determination may again be made as to whether a previously unselected wireless network exists. If it is determined that at least one matching secondary wireless profile exists that corresponds to the selected wireless network and for which a connection has not been attempted during the current or a recent execution of the secondary connection cycle 600 or since a most recent trigger event, a previously unselected matching secondary wireless profile having a highest assigned connection priority among all previously unselected matching secondary wireless profiles may be selected (block 605), and the secondary connection cycle may proceed similarly to the secondary connection cycle 500.

FIG. 7 depicts a flow diagram illustrating a secondary connection cycle 700 in accordance with one or more additional embodiments of the disclosure. Secondary connection cycle 700 differs from secondary connection cycles 500 and 600 in that connection priorities may be assigned to each of the secondary repositories 209A-209C in connection with secondary connection cycle 700. Each secondary repository may be associated with one or more network service providers that form at least part of a roaming wireless network. A connection priority assigned to a particular secondary repository, and hence to an associated service provider, may be based on one or more criteria, including but not limited to, at least one of a preference of a user of the wireless device, a matching secondary wireless profile most recently used to establish a connection between the wireless device and a wireless network, a number of the matching secondary wireless profiles associated with the secondary repository that were previously used to establish one or more connections with one or more wireless networks, a current state or context of the device (e.g. active application(s), active persona, and location), subscription criteria corresponding to the service provider associated with the secondary repository or a geographic region associated with the secondary repository. Further, the connection priority assigned to a particular secondary repository may be dynamically updated based on one or more criteria including, but not limited to, a current state or context of the wireless device, one or more preferences of a user of the wireless device, or one or more characteristics associated with a service provider associated with the secondary repository such as, for example, a geographical region served by the service provider.

In secondary connection cycle 700, if it is determined at block 701 that at least one previously unselected wireless network exists, a previously unselected wireless network that corresponds to a matching secondary profile stored in a secondary repository having a highest assigned connection priority may be selected (block 703). For example, assume previously unselected wireless networks A and B exist. That is, wireless networks A and B have matching secondary wireless profiles corresponding thereto based on which the secondary connection module 206 has not attempted to establish a connection between the wireless device and the corresponding wireless network during the current or a recent execution of the secondary connection cycle 700 or since a trigger event. Further assume that wireless network A has corresponding matching secondary wireless profiles A1, A2 and A3 and that wireless network B has corresponding matching secondary wireless profiles B1, B2 and B3. Matching secondary wireless profiles A1, A2 and A3 may all be stored in a same secondary repository or may be stored in one or more separate secondary repositories. Similarly, matching secondary wireless profiles B1, B2 and B3 may all be stored in a same secondary repository or may be stored in one or more separate secondary repositories.

The secondary connection module 206 may determine which of matching secondary wireless profiles A1, A2, A3, B1, B2 and B3 is stored in a secondary repository having the highest assigned connection priority and may then select the corresponding wireless network. As noted earlier, the connection priority assigned to a secondary repository may be based, at least in part, on a geographical region served by a service provider associated with the secondary repository and/or a current state or context of the wireless device such as, for example, a current geographical location of the wireless device. For exemplary purposes, assume that A1, A2 and A3 are stored in a secondary repository A* having a higher assigned connection priority than a secondary repository B* in which B1, B2 and B3 are stored because A* is associated with a service provider that serves the geographical region in which the wireless device is currently located. Even if the service provider associated with B* also serves the geographical region in which the wireless device is currently located, A* may nonetheless may assigned a higher connection priority because the service provider A* may offer a more extensive wireless network or more reliable connectivity within the current geographical region in which the wireless device is located. As such, based on the higher connection priority assigned to A*, wireless network A may be selected and the secondary connection module 206 may attempt to establish a connection between the wireless device and wireless network A using matching secondary wireless profiles A1, A2 and A3 before attempting to establish a connection with the wireless device and wireless network B. Matching secondary wireless profiles may be selected in a particular order based on connection priorities assigned thereto as previously described through reference to FIG. 6.

In accordance with one or more additional embodiments of the disclosure, the connection priorities assigned to a particular wireless network, secondary wireless profile, and/or secondary repository may be dynamically updated based on one or more criteria. For example, as a mobile user of a wireless device moves from one geographical region to another, the connection priority assigned to a particular secondary repository may increase or decrease depending on whether the service provider associated with the secondary repository serves the geographical region in which the mobile device may be located.

Further, in accordance with one or more embodiments of the disclosure, a means for provisioning and remediating (updating) wireless profiles on a wireless device may be provided. The means for provisioning and remediating wireless profiles may be combined with an update to the secondary connection module 206 (e.g. an enhanced client software update) or may be provided via a separate provisioning channel. Examples of the former include, but are not limited to, traditional app store or app market updates or in-application prompting of updated software. Examples of the latter include, but are not limited to, in-application download, from a secure website, Open Mobile Alliance Device Management (OMA-DM), Open Mobile Alliance Client Provisioning (OMA-CP), ActiveSync, or Technical Report 069 (TR-069). An example of an update to a wireless profile stored in a secondary repository may include a change to the credentials required for authentication by a particular wireless network. If the wireless profile(s) associated with the wireless network have already been duplicated into the primary repository, any updates to the wireless profile(s) in the secondary repository must be synced with the primary repository.

Updated policies for a given secondary repository may be encrypted to permit access to only the service provider associated with that repository. In this manner, accidental or intentional corruption of a secondary repository associated with another service provider may be prevented.

In accordance with one or more embodiments of the disclosure, the secondary connection module 206 may continue to monitor the primary connection module 204 via existing or new API call(s) during execution of the secondary connection cycle. If the primary connection module 204 begins to execute the primary connection cycle while the secondary connection module 206 is executing the secondary connection cycle such as, for example, when beacon signals are received from new wireless network(s) that are within range of the wireless device, and thus new ESSIDs are present in the data structure, the secondary connection module 206 may suspend the secondary connection cycle and move into an idle state so as not to interfere with the primary connection cycle. If the primary connection cycle is unable to establish a connection between the wireless device and any of the new wireless networks within range, the secondary connection module may resume or restart execution of the secondary connection cycle.

Embodiments described herein may be implemented using hardware, software, and/or firmware, for example, to perform the methods and/or operations described herein. Certain embodiments described herein may be provided as a tangible, non-transitory machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In certain embodiments, machine-executable instructions for performing the methods and/or operations described herein may be embodied in software embodied in any of one or more higher-level programming languages capable of being compiled or interpreted, microcode, or firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation. This written description uses examples to disclose certain embodiments of the disclosure, including the best mode, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   scanning, by one or more computer processors, a primary repository for a first primary wireless profile corresponding to a first wireless network;
   determining, by the one or more computer processors, that the first primary wireless profile is stored in the primary repository;
   executing, by the one or more computer processors, a primary connection cycle for the first wireless network responsive to determining that the first primary wireless profile is stored in the primary repository, wherein executing the primary connection cycle comprises attempting to establish a first connection between a wireless device and the first wireless network using the first primary wireless profile;
   determining, by the one or more computer processors, that the primary connection cycle has failed to establish the first connection between the wireless device and the first wireless network;
   scanning, by the one or more computer processors, the primary repository for a second primary wireless profile corresponding to a second wireless network;
   determining, by the one or more computer processors, that the primary repository does not store the second primary wireless profile;
   scanning, by the one or more computer processors, a secondary repository for a secondary wireless profile corresponding to the second wireless network;
   determining, by the one or more computer processors, that the secondary wireless profile is stored in the secondary repository;
   executing, by the one or more computer processors, a secondary connection cycle for the second wireless network responsive to determining that the secondary wireless profile is stored in the secondary repository, wherein executing the secondary connection cycle comprises attempting to establish a second connection between the wireless device and the second wireless network using the secondary wireless profile;
   determining, by the one or more computer processors, that the secondary connection cycle has successfully established the second connection between the wireless device and the second wireless network; and
   storing, by the one or more computer processors, the secondary wireless profile in the primary repository.

2. The method of claim 1, wherein the first primary wireless profile comprises a first wireless network identifier corresponding to the first wireless network and the secondary wireless profile comprises a second wireless network identifier corresponding to the second wireless network.

3. The method of claim 1, further comprising:
   detecting, by the one or more computer processors, a first beacon signal generated by the first wireless network and a second beacon signal generated by the second wireless network,
   determining, by the one or more computer processors, a first wireless network identifier included in the first beacon signal and a second wireless network identifier included in the second beacon signal; and
   generating, by the one or more computer processors, a data structure comprising the first wireless network identifier and the second wireless network identifier.

4. The method of claim 1, further comprising:
   scanning, by the one or more computer processors, the primary repository for a third primary wireless profile corresponding to a third wireless network;
   determining, by the one or more computer processors, that the third primary wireless profile is stored in the primary repository, wherein executing the primary connection cycle further comprises attempting to establish a third connection between the wireless device and the third wireless network using the third primary wireless profile; and
   determining, by the one or more computer processors, that the primary connection cycle has failed to establish the third connection between the wireless device and the third wireless network.

5. The method of claim 4, wherein the one or more computer processors execute the secondary connection cycle responsive to the failure of the primary connection cycle to establish the first connection between the wireless device and the first wireless network and the failure of primary connection cycle to establish the third connection between the wireless device and the third wireless network.

6. The method of claim 4, further comprising:
assigning, by the one or more computer processors, a first connection priority to the first wireless network and a second connection priority to the third wireless network, wherein the first connection priority is higher than the second connection priority, and wherein the primary connection cycle is executed for the first wireless network prior to executing the primary connection cycle for the third wireless network.

7. The method of claim 6, further comprising determining, by the one or more computer processors, at least one of the first connection priority or the second connection priority based on one or more criteria comprising at least one of a signal strength, a signal to noise ratio, a frequency band, or a channel utilization of the wireless network.

8. The method of claim 1, wherein the secondary repository is a first secondary repository, the secondary wireless profile is a first secondary wireless profile, and the wireless device comprises the primary repository, the first secondary repository, and a second secondary repository, the method further comprising:
assigning, by the one or more computer processors, a first connection priority to the first secondary repository and a second connection priority to the second secondary repository, wherein the second connection priority is greater than the first connection priority;
determining, by the one or more computer processors, that the second secondary repository stores a second secondary wireless profile corresponding to a third wireless network;
executing, by the one or more computer processors, the secondary connection cycle for the third wireless network prior to executing the secondary connection cycle for the second wireless network, wherein executing the secondary connection cycle further comprises attempting to establish a third connection between the wireless device and the third wireless network using the second secondary wireless profile; and
determining, by the one or more computer processors, that the secondary connection cycle failed to establish the third connection between the wireless device and the third wireless network.

9. The method of claim 8, further comprising determining the first connection priority based on at least one of a preference of a user of the wireless device, whether the first secondary repository stores a particular secondary wireless profile most recently used to establish a successful connection between the wireless device and a corresponding wireless network, a number of secondary wireless profiles stored in the first secondary repository that were previously used to establish one or more successful connections with one or more wireless networks, subscription criteria corresponding to a service provider associated with the first secondary repository, or a geographic region associated with the first secondary repository.

10. The method of claim 1, wherein the secondary wireless profile is a first secondary wireless profile, the method further comprising:
determining, by the one or more computer processors, that the secondary repository stores a second secondary wireless profile corresponding to the second wireless network;
determining, by the one or more computer processors, that a first connection priority assigned to the first secondary wireless profile is greater that a second connection priority assigned to the second secondary wireless profile; and
executing, by the one or more computer processors, the secondary connection cycle for the second wireless network using the first secondary wireless profile based at least in part on the first connection priority being greater than the second connection priority.

11. A system, comprising:
a primary repository storing one or more primary wireless profiles;
a secondary repository storing one or more secondary wireless profiles;
at least one memory storing a primary connection module and a secondary connection module;
one or more computer processors operatively coupled to the at least one memory, wherein the one or more computer processors are configured to execute one or more computer-executable instructions forming at least part of the primary connection module to:
scan the primary repository for a first primary wireless profile corresponding to a first wireless network,
determine that the first primary wireless profile is stored in the primary repository,
execute a primary connection cycle for the first wireless network responsive to the determination that the first primary wireless profile is stored in the primary repository, wherein executing the primary connection cycle comprises attempting to establish a first connection between a wireless device and the first wireless network using the first primary wireless profile,
determine that the primary connection cycle has failed to establish the first connection between the wireless device and the first wireless network,
scan the primary repository for a second primary wireless profile corresponding to a second wireless network, and
determine that the primary repository does not store the second primary wireless profile, and
wherein the one or more computer processors are configured to execute one or more computer-executable instructions forming at least part of the secondary connection module to:
scan the secondary repository for a secondary wireless profile corresponding to the second wireless network,
determine that the secondary wireless profile is stored in the secondary repository,
execute a secondary connection cycle for the second wireless network responsive to a determination that the secondary wireless profile is stored in the secondary repository, wherein executing the secondary connection cycle comprises attempting to establish a second connection between the wireless device and the second wireless network using the secondary wireless profile,
determine that the secondary connection cycle has successfully established the second connection between the wireless device and the second wireless network, and
store the secondary wireless profile in the primary repository.

12. The system of claim 11, wherein the first primary wireless profile comprises a first wireless network identifier corresponding the first wireless network and the secondary wireless profile comprises a second wireless network identifier corresponding to the second wireless network.

13. The system of claim 11, wherein the one or more computer processors are further configured to:
- detect a first beacon signal generated by the first wireless network and a second beacon signal generated by the second wireless network;
- determine a first wireless network identifier included in the first beacon signal and a second wireless network identifier included in the second beacon signal; and
- generate a data structure comprising the first wireless network identifier and the second wireless network identifier.

14. The system of claim 11, wherein the one or more computer processors are further configured to execute the one or more computer-executable instructions forming at least part of the primary connection module to:
- scan the primary repository for a third primary wireless profile corresponding to a third wireless network;
- determine that the third primary wireless profile is stored in the primary repository, wherein executing the primary connection cycle further comprises attempting to establish a third connection between the wireless device and the third wireless network using the third primary wireless profile; and
- determine that the primary connection cycle has failed to establish the third connection between the wireless device and the third wireless network.

15. The system of claim 14, wherein the one or more computer processors are further configured to execute the secondary connection cycle responsive to the failure of the primary connection cycle to establish the first connection between the wireless device and the first wireless network and the failure of the primary connection cycle to establish the third connection between the wireless device and the third wireless network.

16. The system of claim 14, wherein the one or more computer processors are further configured to assign a first connection priority to the first wireless network and a second connection priority to the third wireless network, wherein the first connection priority is higher than the second connection priority, and wherein the primary connection cycle is executed for the first wireless network prior to executing the primary connection cycle for the third wireless network.

17. The system of claim 16, wherein the one or more computer processors are further configured to determine at least one of the first connection priority or the second connection priority based on one or more criteria comprising at least one of a signal strength, a signal to noise ratio, a frequency band, or a channel utilization of the available wireless network.

18. The system of claim 11, wherein the secondary repository is a first secondary repository, the secondary wireless profile is a first secondary wireless profile, and the wireless device comprises the primary repository, the first secondary repository, and a second secondary repository, and wherein the one or more computer processors are further configured to:
- assign a first connection priority to the first secondary repository and a second connection priority to the second secondary repository, wherein the second connection priority is greater than the first connection priority,
- determine that the second secondary repository stores a second secondary wireless profile corresponding to a third wireless network,
- execute the secondary connection cycle for the third wireless network prior to executing the secondary connection cycle for the second wireless network, wherein executing the secondary connection cycle further comprises attempting to establish a third connection between the wireless device and the third wireless network using the second secondary wireless profile, and
- determine that the secondary connection cycle failed to establish the third connection between the wireless device and the third wireless network.

19. The system of claim 18, wherein the one or more computer processors are configured to determine the first connection priority based on at least one of a preference of a user of the wireless device, whether the first secondary repository stores a particular secondary wireless profile most recently used to establish a successful connection between the wireless device and a corresponding wireless network, a number of the secondary wireless profiles stored in the first secondary repository that were previously used to establish one or more successful connections with one or more wireless networks, subscription criteria corresponding to a service provider associated with the first secondary repository, or a geographic region associated with the first secondary repository.

20. The system of claim 11, wherein the secondary wireless profile is a first secondary wireless profile, and wherein the one or more processors are further configured to:
- determine that the secondary repository stores a second secondary wireless profile corresponding to the second wireless network,
- determine that a first connection priority assigned to the first secondary wireless profile is greater than a second connection priority assigned to the second secondary wireless profile, and
- execute the secondary connection cycle for the second wireless network using the first secondary wireless profile based at least in part on the first connection priority being greater than the second connection priority.

21. One or more non-transitory computer-readable media storing one or more computer-executable instructions that responsive to being executed by one or more computer processors cause operations to be performed comprising:
- scanning a primary repository for a first primary wireless profile corresponding to a first wireless network;
- determining that the first primary wireless profile is stored in the primary repository;
- executing a primary connection cycle for the first wireless network responsive to determining that the first primary wireless profile is stored in the primary repository, wherein executing the primary connection cycle comprises attempting to establish a first connection between a wireless device and the first wireless network using the first primary wireless profile;
- determining that the primary connection cycle has failed to establish the first connection between the wireless device and the first wireless network;
- scanning the primary repository for a second primary wireless profile corresponding to a second wireless network;
- determining that the primary repository does not store the second primary wireless profile corresponding to the second wireless network;
- scanning a secondary repository for a secondary wireless profile corresponding to the second wireless network;
- determining that the secondary wireless profile is stored in the secondary repository;
- executing a secondary connection cycle for the second wireless network responsive to determining that the secondary wireless profile is stored in the secondary repository, wherein executing the secondary connection cycle comprises attempting to establish a second connection between the wireless device and the second wireless network using the secondary wireless profile;

determining that the secondary connection cycle has successfully established the second connection between the wireless device and the second wireless network; and storing the secondary wireless profile in the primary repository.

22. The one or more non-transitory computer-readable media of claim 21, the operations further comprising:

scanning the primary repository for a third primary wireless profile corresponding to a third wireless network;

determining that the third primary wireless profile is stored in the primary repository, wherein executing the primary connection cycle further comprises attempting to establish a third connection between the wireless device and the third wireless network using the third primary wireless profile; and determining that the primary connection cycle has failed to establish the third connection between the wireless device and the third wireless network.

23. The one or more non-transitory computer-readable media of claim 22, wherein the secondary connection cycle is executed responsive to the failure of the primary connection cycle to establish the first connection between the wireless device and the first wireless network and the failure of the primary connection cycle to establish the third connection between the wireless device and the third wireless network.

* * * * *